US005829149A

United States Patent [19]
Tyson

[11] Patent Number: 5,829,149
[45] Date of Patent: Nov. 3, 1998

[54] WALKING PROFILOMETER

[76] Inventor: Graham Roland Tyson, 11 Susanne Avenue, Nunawading, Victoria, 3131, Australia

[21] Appl. No.: 619,770

[22] PCT Filed: Sep. 26, 1994

[86] PCT No.: PCT/AU94/00578

§ 371 Date: Jul. 1, 1996

§ 102(e) Date: Jul. 1, 1996

[87] PCT Pub. No.: WO95/09347

PCT Pub. Date: Apr. 6, 1995

[30] Foreign Application Priority Data

Sep. 27, 1993 [AU] Australia ........................... PM1463/93

[51] Int. Cl.[6] ............................... G01B 5/28; E01C 23/00
[52] U.S. Cl. ................................. 33/523; 33/521; 73/146
[58] Field of Search ............................. 33/338, 521, 523, 33/523.1, 523.2, 551–554; 73/104, 105, 146

[56] References Cited

U.S. PATENT DOCUMENTS

| | | | |
|---|---|---|---|
| 3,594,912 | 7/1971 | Sauterel et al. | 33/523 |
| 3,797,124 | 3/1974 | Easterling et al. . | |
| 3,857,183 | 12/1974 | Plasser et al. | 33/523 |
| 4,442,709 | 4/1984 | Waters | 73/146 |
| 4,548,070 | 10/1985 | Panetti | 33/523 |
| 4,741,207 | 5/1988 | Spangler . | |

FOREIGN PATENT DOCUMENTS

| | | |
|---|---|---|
| 1025267 | 4/1953 | France . |
| 243822 | 12/1925 | United Kingdom . |

*Primary Examiner*—William A. Cuchlinski, Jr.
*Assistant Examiner*—Andrew Hirshfeld
*Attorney, Agent, or Firm*—Knobbe, Martens, Olson and Bear, LLP

[57] ABSTRACT

A profilometer having a beam placement system which includes a beam pivotally connected to a front and a rear foot member. The foot members are spaced along the length of the beam and are arranged to be positioned on a section of pavement. The beam placement system also includes a system for repositioning the front and rear foot members so that, upon forward movement of the profilometer along the pavement whose profile is to be measured, the rear foot member is positioned on the section of pavement previously occupied by the front foot member. The beam placement system additionally includes an apparatus for measuring the slope of the beam between the front and rear foot members.

17 Claims, 2 Drawing Sheets

10
12
14
16
14a
18
24
22
30
80
20
14b
26
12
14
16
24
14b
20
80
14a
18
22
28

200
200
98
100
104
106
96
64
52
58
58
88
82
90
62
50
92
94
60
56
84
92
94
90
82
88
66
58
54
106
96
102
104
100
58
98

WALKING PROFILOMETER

FIELD OF THE INVENTION

The present invention relates to a profilometer for measuring the longitudinal profile of a road or other surface. In particular, the present invention relates to a profilometer which may be pushed over a surface by a single walking operator.

BACKGROUND OF THE INVENTION

Numerous devices have previously been developed for the measurement of imperfections in road surfaces. The measurements obtained from these devices provide a means of assessing vehicle ride quality over the surface. Authorities responsible for road construction and maintenance require such information so as to monitor the deterioration of the road surface and so as to ensure driver comfort and safety when driving on the road surface.

One of the first machines used to assess the quality of a road surface relied on the measurement of relative vertical movement between one axle and the chassis of a particular motor vehicle as it was driven along the road surface at a typical speed. The major weakness with this type of machine was that it did not provide a true description of the road surface but rather a description of a particular vehicle's response to that road surface. Therefore, the results were very dependent on the vehicle's operating speed, loading, suspension and even the type of tires it used. Clearly, all of these features differ greatly from one vehicle to another. In order to minimize these variations when measuring the road surface quality it was and is common practice to maintain certain vehicles solely for use in road surface quality measurements.

In recognition of the problems faced by these earlier machines attempts were made to develop a one wheel reference trailer which could be towed by a vehicle and which would have an idealized suspension system. Ideally, the trailer would have linear springs of a constant and well defined rate, static and dynamic elements with precisely defined masses, suspension dampers with constant and well defined linear relationships between the vertical velocity and the damping force, and a defined type of tire with a guaranteed level of concentricity. Although the results obtained with these trailers were more consistent than those obtained using vehicle based units they were still seen as relatively unreliable because of the uncontrollable variabilities. These trailers also required meticulous maintenance and were more difficult to use than the vehicle based units.

In response to a need to obtain comprehensive information on road surface imperfections a specialized measuring instrument was developed. The instrument included an inertially stabilised height reference platform which was towed behind a vehicle at normal traffic speeds. The height reference platform was arranged to slowly follow the average road surface height. The detailed road surface height was continuously measured and recorded with respect to the height of the reference platform. The resulting record was called a longitudinal profile of the road surface. The advantage of this instrument was that it made a true measurement of discrepancies in the actual road surface which was independent of the ride characteristics of the towing vehicle. This instrument led to the development of a number of high technology systems for measuring the imperfections in road surfaces. These instruments became known as longitudinal highway profilometers or more simply as profilometers.

A modern profilometer is usually mounted in a specially modified vehicle and uses rapid response and high precision non-contacting displacement transducers to measure the distance between various points on the road surface and the vehicle chassis. The inertial height reference is usually computed from accelerometer signals representing vertical dynamic acceleration of the vehicle chassis. The measurements obtained can be stored so that a profile of the road surface can be developed. Summary statistics commonly obtained from the profile include the International Roughness Index (I.R.I), the root mean square vertical acceleration (R.M.S.V.A.), and simulated output corresponding to the value which would be produced by a National Association of Australian State Road Authorities roughness monitoring vehicle.

Profilometers of the type described above are able to provide accurate results but are very expensive to manufacture and skilled operators are required to use them properly. These forms of profilometers are relatively fragile devices and thus require continuous maintenance and particular care must be taken when they are being used. Profilometers of this sort are also unsuitable for testing short sections of road where there is insufficient run-up road to get the system up to operating speed or insufficient run-down road to allow for safe stopping. This is often the case in minor roadworks. Also, because of the weight of the host vehicle, these types of profilometers cannot be used to test the surface of recently poured concrete. These forms of profilometers cannot commonly be used to test bridge decks because the deck is usually layed and finished before the access roads are built.

Profile measurements under these conditions have been traditionally made by a team of two operators using optical surveying instruments. This is a very slow process if conducted with sufficient care and making height measurements at a sufficiently large number of points, to establish motor vehicle ride quality of the surface.

Other instruments have been devised to make measurements of the slope of successive longitudinal increments of pavement, but even though considerably faster than optical survey methods, they are tedious and require considerable operator skill to obtain adequate quality records.

The present invention seeks to considerably increase the speed of recording high quality profiles and reduce the dependence on operator skill, compared with prior art low speed profilometers intended for use where highway speed profilometers cannot be used.

SUMMARY OF THE INVENTION

According to a first aspect of the present invention there is provided a profilometer comprising a beam placement system which comprises a beam pivotally connected to front and rear foot members, which foot members are spaced along the length of the beam, each said foot member being arranged to be positioned on a section of pavement, means for repositioning said front and rear foot members so that upon forward movement of the profilometer along the pavement whose profile is to be measured the rear foot member can be positioned on the section of pavement previously occupied by said front foot member, and means for measuring the slope of the beam between the front and rear foot members.

Preferably, the beam is arranged during a dwell phase to remain stationary on the pavement while the profilometer continues to travel forward over the pavement. The means for measuring the slope of the beam is preferably activated during the dwell phase.

Preferably, the profilometer further comprises means for determining the total distance from the start of a measuring run to each particular placement of said front foot member.

Preferably, the repositioning means comprises a cyclic dwell mechanism and an auxiliary mechanism and the beam is arranged to be indirectly connected to the cyclic dwell mechanism by the auxiliary mechanism.

In a preferred embodiment, the cyclic dwell mechanism is arranged to output a cyclic motion which is defined by a dwell phase, a combined ascent and forward acceleration phase, a nominally constant speed forward travel phase and a combined decent and deceleration to zero speed phase. The auxiliary mechanism is arranged to be mechanically isolated from the beam during the dwell phase of the cyclic dwell mechanism. Preferably, the cyclic dwell mechanism is powered from the passive rotation of a pair of wheels which are arranged to be mounted in line and to rotate in a synchronised manner as the profilometer is driven forwardly.

Preferably, triggering means associated with one of said wheels or a part of the beam placement system is provided for triggering the measuring means to measure the slope of the beam. The slope of the beam may be measured by a servo accelerometer which is mounted so as to indicate the component of gravity which is in line with the longitudinal axis of the beam and which is proportional to the sine of the absolute slope with respect to the true local horizontal. The height increment between the front and rear foot members for any particular placement of the beam is equal to the distance between the front and rear foot members multiplied by the sine of the slope angle. Means is preferably provided to record the height increments and to determine a pavement profile. The profile of the pavement is preferably constructed by adding the height increments from placement to placement of the foot members and presenting them on a horizontal scale where the travel distance is in principle the number of placements from the start of the run, multiplied by the foot to foot spacing.

Preferably, the profilometer further comprises a wheeled carriage connected to said beam placement system. The carriage being arranged to provide a transversely and longitudinally stable reference for making profile measurements and a means for freely manoeuvring the profilometer at a brisk walking speed, with the beam positioning mechanism raised out of contact with the surface over which the profilometer is travelling.

An embodiment of the invention will now be described, by way of example only, with reference to the accompanying drawings in which:

DESCRIPTION OF THE PREFERRED EMBODIMENT

Figure 1:
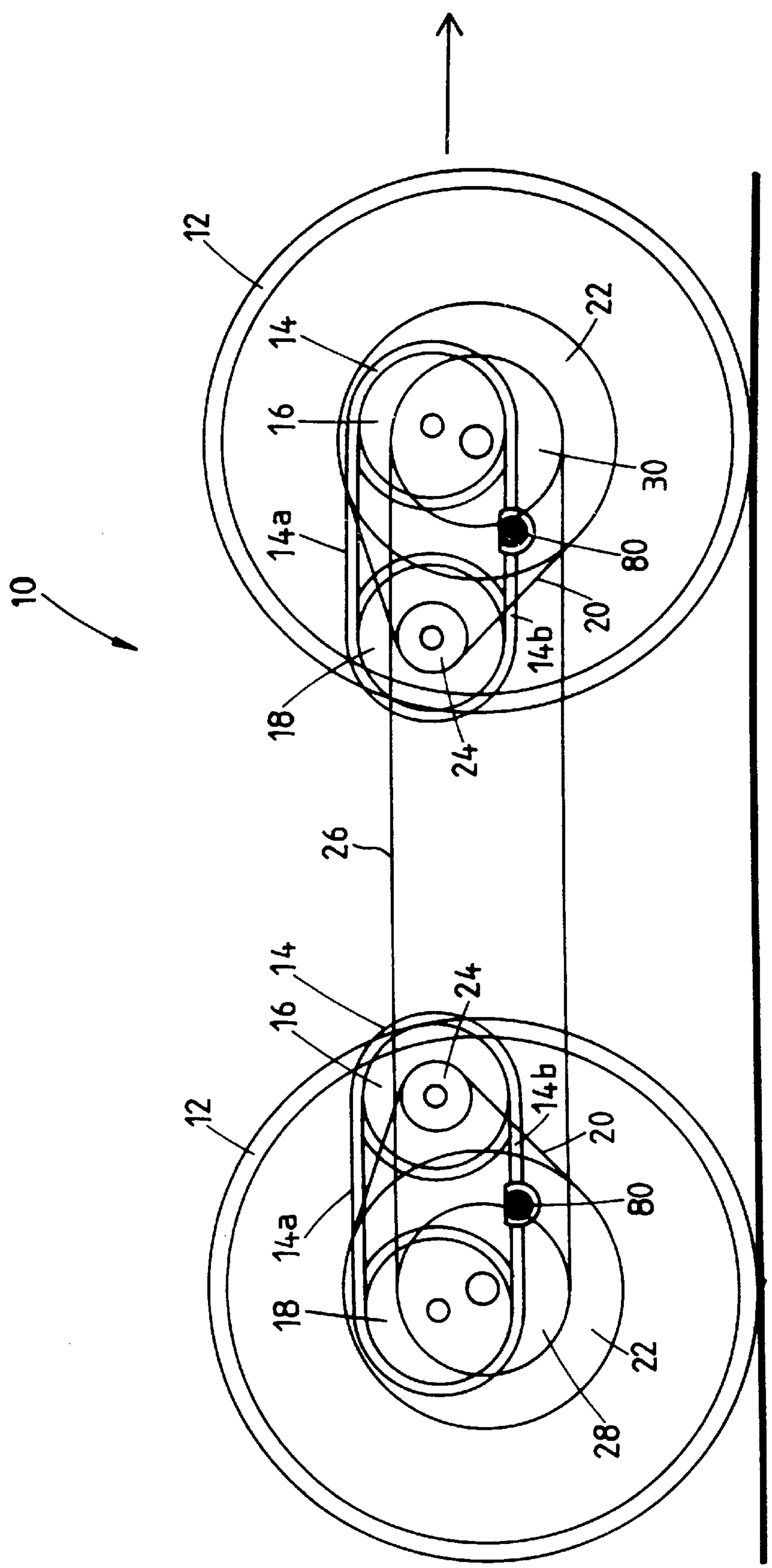
FIG. 1 is a simplified side view of a duplicated cyclic dwell mechanism of a profilometer according to an embodiment of the invention. The measuring system chassis is not shown for clarity. The chassis provides mounting for the bearings, axles and related items such as guiding tracks, belt and chain tensioning provisions, precisely phased starting and stopping devices and coupling to the wheeled carriage.
Figure 2:
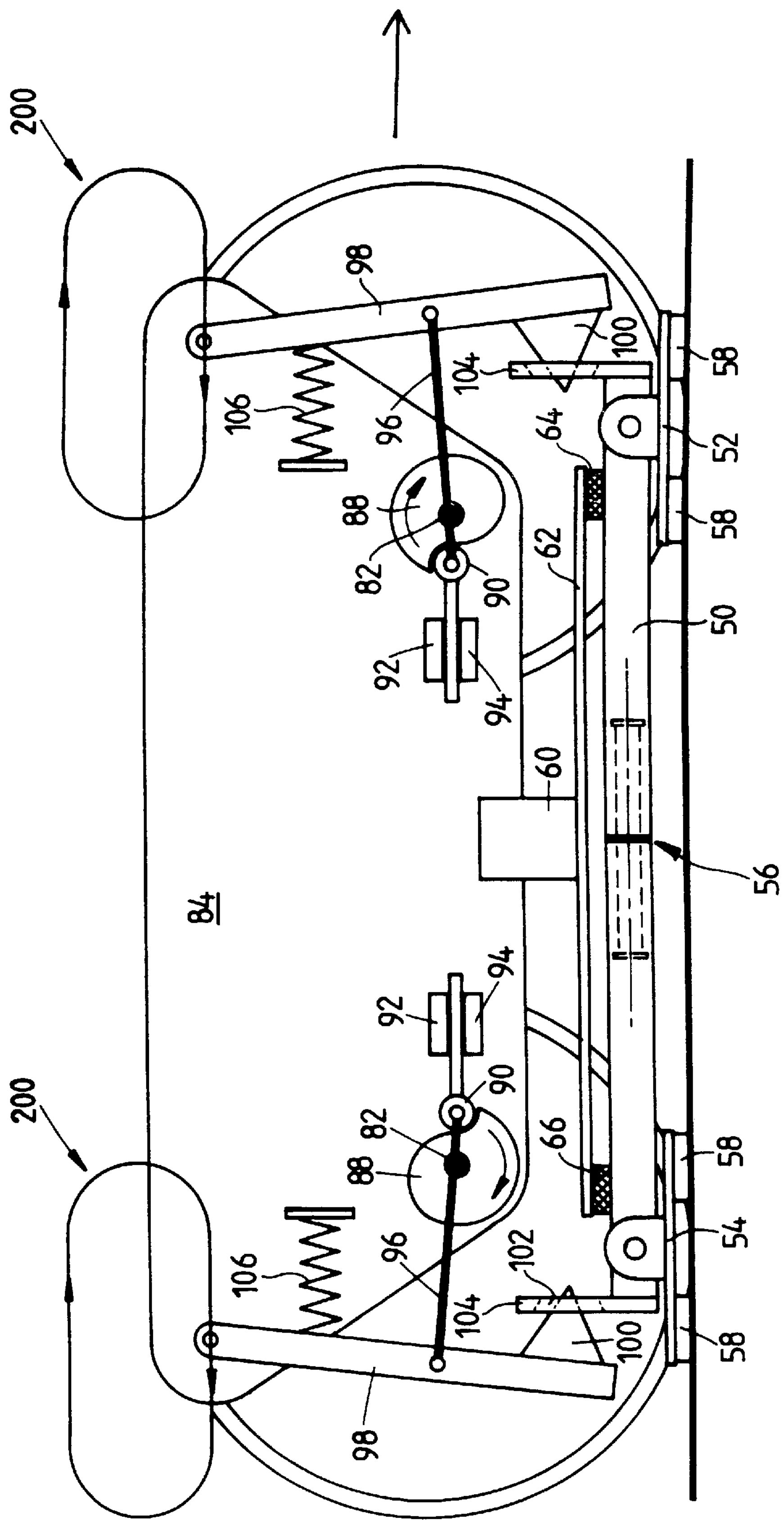
FIG. 2 is a schematic side view of a beam placement mechanism and measuring beam of a profilometer according to an embodiment of the invention, overlaid upon and coupled to the cyclic dwell mechanism shown in FIG. 1.

A profilometer according to an embodiment of the invention comprises a beam placement system, as shown in FIGS. 1 and 2, coupled to and supported from a wheeled carriage 1. The wheeled carriage ensures that the wheels of the beam placement system are in continuous contact with the surface while making profile measurements and provides a laterally and longitudinally stable reference for it. The wheeled carriage is pushed by a walking operator along a length of pavement to make a profile recording.

The wheeled carriage provides a support for all auxiliary electronic items needed for the proper function of the profilometer. Such items include a portable computer used for data acquisition, display and processing of results. The carriage may also incorporate means to raise the entire beam placement mechanism out of contact with the surface whose profile is being measured, so as to enable the profilometer to be easily manoeuvred when it is not being used to make profile measurements.

An additional non-load-bearing wheel of precisely known circumference may be added to the carriage and so suspended that its angular movement about its own axle is precisely related to the distance travelled by the profilometer. This wheel may be fitted with an encoder which produces a train of electrical pulses, with each pulse representing a precise small increment of longitudinal movement of the profilometer. In situations where longitudinal travel indication based on the beam length multiplied by the number of placements is not sufficiently accurate, these pulses can be electronically counted to give a very precise indication of longitudinal travel.

The carriage may also incorporate a spring activated brake which must be manually held in the released state by the operator using a non-latching lever mounted to the push handle, when either manoeuvring the profilometer or making a profile recording.

The wheeled carriage may take a variety of forms with a variety of means of coupling between itself and the beam placement mechanism. It can also utilize a variety of means to raise the beam placement mechanism out of surface contact and a variety of means to apply braking to its wheels.

A primary component of the beam placement system is the duplicated cyclic dwell mechanism 10 as shown in FIG. 1. The two halves of the cyclic dwell mechanism 10 are essentially similar and each comprise a wheel 12 and a small pitch chain 14 which is mounted on a pair of identical front and rear sprockets 16, 18. The front sprocket 16 of the rear chain loop and the rear sprocket 18 of the front chain loop are driven via toothed belts 20 which are mounted on drive sprockets 22, 24. Sprockets 22, 24 in turn are driven directly by the wheels 12. The ratio between the drive sprockets 22, 24 is 4:1. The circumference of the wheel 12 of each half of the cyclic dwell mechanism 10 is precisely equal to twice the length of the loops of chain 14. The minor differences between the two halves of the cyclic dwell mechanism 10 are simply to accommodate dimensional limitations.

The wheels 12 of each half of the cyclic dwell mechanism 10 are synchronized by an absolute unity ratio drive consisting of a toothed belt 26 which is mounted on a pair of identical sprockets 28, 30. Sprocket 30 is coupled to its corresponding wheel 12 by a device which allows for infinite relative angular adjustment between them, to enable precise synchronisation of the movements of the two chain loop joining links 80. The axles of the wheels 12 may be fitted with one way clutches or brakes (not shown) to prevent potentially damaging reverse rotation of the cyclic dwell mechanism.

Each chain 14 comprises 38 links of 0.250 inch pitch and has a total length of 9.50 inches. Front and rear sprockets 16, 18 each have 19 teeth and therefore each chain 14 makes one complete pass about the front and rear sprockets 16, 18 for each two revolutions of the sprockets 16, 18. Since the toothed belt 20 and drive sprockets 22, 24 between the wheels 12 and the respective driving sprockets 16, 18 of the chain loops have a step-up ratio of precisely 4:1, it follows that each chain loop 14 will make one complete pass around its corresponding sprockets 16, 18, for every precise half turn of the wheels 12.

The tires of the wheels 12 are ground to have a half-circumference of precisely 9.50 inches, which is equal to the length of the chain loops. Therefore, the wheels will rotate precisely one half turn for every 9.50 inches of travel of the profilometer as it is pushed along with the beam placement mechanism in contact with the surface being profiled.

Chain 14 can be divided into an upper unsupported section 14*a* and a lower unsupported section 14*b*. The lower unsupported section 14*b* is driven backwards at precisely the same speed as the profilometer is pushed forwards so that the links in the unsupported section 14*b* of the chain appear to be stationary above the pavement as the profilometer is pushed along the pavement. As each link of the chain 14 travels around the rear sprocket 18 it is also accelerated forwards so that by the time it leaves the top of the rear sprocket 18 to travel in the upper unsupported section 14*a* it has attained a forward speed equal to twice the forward speed of the profilometer. As each link of the chain 14 descends around the front sprocket 16 it is decelerated in the forward direction so that by the time it leaves the bottom of the front sprocket 16 to travel in the lower unsupported section 14*b* of the chain it has reached zero forward speed, irrespective of the travel speed of the profilometer. It will therefore be appreciated that any object coupled to a link of the chain 14 will be subject to a cyclic motion defined by:

(1) A dwell phase ("phase 1") in which it is stationary above the pavement at a low elevation, followed by (2) A longitudinal acceleration ("phase 2") coupled with lifting to an increased elevation, followed by (3) A forward travel phase ("phase 3") at a speed equal to twice the profilometer speed at the increased elevation, followed by (4) Decent to the lower elevation and deceleration to zero forward speed in preparation for the next dwell phase ("phase 4").

The duplicated cyclic dwell mechanism 10 is operatively connected to a beam 50 which is shown in FIG. 2. The operative connection between the beam and the cyclic dwell mechanism 10 will be discussed in detail below.

The beam 50 is pivotally connected to a front and a rear foot 52, 54. The length of the beam 50 between the pivotal connections of each foot 52, 54 is 9.50 inches. The length of the beam 50 between the front and rear feet 52, 54 is equal to the length of the chain 14. The beam 50 is torsionally articulated at its midpoint 56.

Each foot 52, 54 is arranged to contact the pavement via three rubber pads 58. The rubber pads 58 are arranged such that the centre of each foot 52, 54 represents the average height of the section of the pavement on which the respective foot 52, 54 is positioned. The use of this type of foot 52, 54 together with the torsionally articulated beam 50 ensures that the beam 50 will sit securely on any pavement, with the beam 50 adopting the slope between the two feet 52, 54. In this way the beam provides a precise representation of the slope of the section of pavement between the two feet 52, 54.

The slope of the beam 50 is measured by a servo accelerometer 60 which is mounted on an elongated light weight plate 62. Plate 62 is coupled at each end to the beam 50 via two pieces of durable resilient soft foam synthetic rubber 64, 66. This arrangement of the accelerometer 60 allows for the rapid settling of transients and accurate indication of the effective slope between the front and rear feet 52, 54 of the beam 50. The foam rubber suspension 64, 66 also protects the accelerometer 60 from dangerous transient acceleration during the non-dwell phases of the profilometer.

In order to measure the profile of a pavement the beam 50 must be stepped along the pavement. This stepping motion of the beam 50 is achieved by coupling of the beam 50 to the cyclic dwell mechanism 10. However, as it is critical that the accelerometer 60 is not subject to any movement or vibration while being used to measure the gravitational slope, the beam 50 is not directly coupled to the chain 14 of the cyclic dwell mechanism 10. Rather, the beam 50 is indirectly coupled to the chains 14 by an auxiliary mechanism. The auxiliary mechanism, which is best illustrated in FIG. 2, is arranged so as to enable the beam 50 to be separated from the cyclic dwell mechanism 10 and carriage during the dwell phase of the profilometer.

An auxiliary mechanism is attached to each half of the cyclic dwell mechanism. The auxiliary mechanism includes a joining link 80 (FIG. 1) which is formed as a link of the chain 14. Each joining link 80 is arranged to provide a rotating output via a shaft 82 (FIG. 2) which transfers the varying orientation of the link 80 (FIG. 1) to an intervening mechanism which successively captures and releases the beam 50 from the profilometer. The two joining links 80 of the duplicated cyclic dwell mechanism 10 are arranged such that both execute exactly the same phases of movement simultaneously. The two joining link output shafts 82 are coupled to bearings (not shown) which are mounted on a large lightweight beam placement plate 84 in such a manner that the entire plate 84 executes a horizontal and vertical cyclic motion with respect to the sub chassis (not shown) which supports the axles of wheels 12. The horizontal and vertical cyclic motion of the beam placement plate 84 is identical to that of the coupling links 80. The motion of the beam placement plate 84 is illustrated by the loops 200 shown in FIG. 2.

The beam placement plate 84 is maintained vertically throughout all phases of beam placement by an additional non driven twin link stabilising device. The weight of the beam placement plate 84 during the dwell phase and the combined weight of the plate 84 and beam 50 during the forward travel phase is carried by cam rollers rolling on horizontal guides, so that the unsupported lengths of chain 14*a* and 14*b* do not have to carry the load. For diagrammatic clarity none of these items are shown.

The two joining link output shafts 82 rotate 180° C. clockwise during the "lowering and decelerating" phase (phase 4) and a further 180° C. clockwise during the "raising and forward acceleration" phase (phase 2). They do not rotate during the "dwell" phase (phase 1) or during the "double speed forward travel" phase (phase 3).

The rotation of each output shaft 82 is converted to a cyclic horizontal motion by means of a cam 88 and a cam follower 90. The cam follower 90 is constrained to move in a horizontal direction by a mechanism shown diagrammatically as an upper and a lower guide 92, 94. Each cam follower 90 is connected by a link 96 to a beam capture arm 98. Each beam capture arm 98 is pivotally connected to the top of the beam placement plate 84 and is arranged to swing parallel thereto. Attached to the free end of each beam capture arm 98 is a laterally separated pair of pick-up cones 100, of which only the near one is shown in FIG. 2. Each pair of pick-up cones 100 is arranged to engage in correspondingly shaped apertures 102 formed in a plate 104 which is attached to the adjacent end of the beam 50. The beam pick-up arms 98 are biased strongly away from plates 104 by compression springs 106.

FIG. 2 shows the mechanism in "dwell" phase (phase 1). In this phase, the beam capture arms 98 are fully retracted from the apertures 102 in the plates 104. The pick-up arms 98 remain retracted until the joining links 80 reach the end of the dwell phase (phase 1) and commence the "rising and forward acceleration" phase (phase 2) in which the cams 88 commence a 180° C. rotation. The pair of beam capture arms 98 are then driven toward each other so that the pick-up cones 100 enter the apertures 102 and capture the beam 50. This process of capturing the beam 50 is completed by the time the beam placement plate 84 and the cams 88 reach the top of the "raising and forward acceleration" phase (phase 2) of the profilometer. As the cams 88 do not rotate during the "forward travel" phase (phase 3) of the profilometer, the slope measuring beam 50 remains captured during this phase and is carried forward well above the pavement in preparation for the next beam placement. As the joining links 80 and cams 88 commence the "lowering and decelerating" phase (phase 4), the cams 88 commence their next 180° C. clockwise rotation. However, as the cams 88 have a constant radius for most of the next 180° C. of rotation, the slope measuring beam 50 remains captured by the beam capture arms 98 and cones 100 for nearly all of this phase. Therefore, during phase 4 the beam 50 is decelerated almost to a standstill even though the profilometer is moving steadily forwards. During phase 4, the beam 50 is also lowered to within a few millimetres of the pavement. At this time, the cams 88 come to a sudden discontinuity. The cam followers 90 are thereby caused to snap outwardly, allowing the beam capture arms 98 to move away from each other under the bias of the springs 106. The beam 50 then falls the last few millimetres to the pavement and is therefore disconnected from the profilometer. In this position, the pick-up cones 100 clear the apertures 102 by at least 6 mm in all directions. The cones 100 are preferably provided with extension pins (not shown) which take no part in the operation of the capture and release of the beam 50, but ensure that the beam 50 cannot be totally severed from the profilometer during normal operation. A small pneumatic damping cylinder (not shown) may be coupled between the two beam capture arms 98 to minimise the shock to the mechanism when the arms snap outwardly.

When the slope measuring beam 50 lands on the pavement, rear foot 54 is positioned precisely on the section of pavement previously occupied by the front foot 52. Both feet 52, 54 rapidly settle on their three rubber pads 58. The longitudinal tilt of the beam 50 is allowed for by the pivotal connection which connects the beam 50 to each foot 52, 54. Transverse tilt is allowed for by the torsional articulation provided at the midpoint 56 of the beam 50.

The beam 50 is now in the dwell phase (phase 1). In phase 1, the beam 50 settles onto the pavement and the transients resulting from placement of the beam 50 both in the beam feet 52, 54 and the accelerometer 60 die away. Although the beam 50 is strictly stationary it should be remembered that the profilometer moves forward continuously. Just before the end of the dwell phase (phase 1), a non-contacting position detector 42 associated with a marker cam (not shown) on one of the wheels 12, produces a trigger signal which causes a data logger to read the indicated slope from the accelerometer 60 for this particular beam placement. After the slope has been read, the joining links 80 and cams 88 move into the "raising and forward acceleration" phase (phase 2). During phase 2, the beam 50 is raised from its position in contact with the pavement and is accelerated in a forward direction to twice the forward speed of the profilometer. The beam 50 is then moved ahead of the profilometer with its feet 52, 54 well clear of the pavement (phase 3) and thereby makes up for the time lost during the dwell phase (phase 1) in which the beam 50 remained stationary.

The forward movement between beam placements is exactly equal to the effective beam length. This is because the beam length and the length of the chain 14 are equal. This allows for the mathematical construction of a true profile from a continuous series of longitudinal increments, whose slant lengths are all identical and equal to the effective beam length and whose height change from foot to foot is the sine of the slope angle with respect to the true horizontal multiplied by the effective beam length.

The described profilometer is capable of making measurements of absolute height change between successive points which are less than 250 mm apart, to an accuracy of about +or−0.2 mm/m. This places the profilometer well into the Class 1 profilometer accuracy category.

The described profilometer preferably incorporates an on-board data logging system and computer which is capable of on-line construction and display of the primary pavement profile. The profilometer computer preferably includes full software to perform off-line data reduction to produce a number of profile summary statistics for any particular measurement run. These statistics include the International Roughness Index, Equivalent N.A.A.S.R.A. roughness, Equivalent May's Index, Root Mean Square Vertical Acceleration, Equivalent California Profilograph Index, wavelength and amplitude spectra of various types.

The described profilometer can operate continuously and record valid data at any speed from zero to approximately 1 km per hour, but future refinements may allow for operation at a significantly higher speed. Simple audible monitoring tones are provided to indicate when the carriage speed is approaching the working limit.

Alternatively, a mechanical or electromechanical governor could be applied to the carriage wheels to explicitly limit the maximum speed.

As a further alternative within the same measurement principle, the carriage could be powered by an electric or fuelled motor operating at a constant optimal speed irrespective of surface type or slope. It would be started, stopped, and steered by remote control either via a lightweight lead or by a suitable "wireless" means.

It is recommended that a fast acting gravitational tilt sensor be used to measure the slope of the beam because of the brevity of the period in each measurement cycle when its feet are in the correct position to indicate the true slope. Although the described embodiment uses a servo accelerometer for this purpose there are many other possible alternatives to this device. These include devices which primarily measure gravitational slope or other forms of in-line accelerometer, either fast acting passive or force balance types. Another possibility is to develop a purpose specific servo clinometer with cage/release capability which could be kept in the caged condition during all phases of the beam placement other than the "dwell" phase, to reduce the possibility of shock damage during placement.

In the described embodiment, each foot 52, 54 is arranged to contact the pavement via three rubber pads 58. It is envisaged that numerous other arrangements could be used for this purpose. For example spring bristle brushes, soft but durable foam polymer sheet materials or fluid damped pads could be used.

It should also be noted that the two wheels 12 could be coupled together by a number of different mechanisms other than the belt 26. For example, a longitudinal shaft with bevel gears at each end, a gear train, or a loop of roller chain could be used to provide the necessary absolute coupling.

In the described embodiment, the circumference of the wheels 12 is exactly twice the length of the chain 14, which means that there will be precisely two beam placement/slope measurement cycles per revolution of the wheels 12. This provides an easy means of obtaining an appropriately timed electrical pulse late in the dwell phase, once for each successive 180 degrees of rotation of the wheels 12, to control the recording of the slope for each particular beam placement.

It is nevertheless not fundamentally necessary to have any particular ratio between the profilometer wheel rotation and the beam placement cycle, provided that the wheel diameter and coupling ratio are such that the lower unsupported length of the chain 14*b* is driven backwards at precisely the same speed as the profilometer moves forward. If the coupling ratio is not an integer value, some means other than a cam driven from the wheel axle will be needed to provide correctly timed electrical pulses to control recording of the slope.

In the early 1980's, the World Bank established a set of international standards for highway profilometry. The most stringent, called Class 1, requires the measurement of relative height of successive points on a highway to an accuracy of less than 1 mm per longitudinal metre, and at a longitudinal spacing of not more than 250 mm.

Although the walking profilometer of the present embodiment has height measuring accuracy much finer than Class 1 requirements, it is generally desirable to have the beam length as large as possible for a particular application. The described embodiment has therefore been sized to use a beam with an effective foot to foot spacing of 9.50 inches (241.3 mm), which is the largest practical size short of 250 mm which can be based on the use of American standard chain for the loops 14. This enables the unit to measure profiles to Class 1 standards. American standard chain was chosen in favour of metric chain because of its much larger coupling pins which enhance the function of the links 80.

Many alternative variations of profilometer wheel diameter, chain type, link size, number of links, and sprocket size could be used to produce practical embodiments of the system for situations not requiring compliance with World Bank highway profilometry standards; such as assessments of aircraft runways, footpaths, paved sporting grounds etc. It is required nonetheless that the effective longitudinal foot to foot distance of the beam be precisely equal to the length of each of the chains.

The described embodiment makes use of laterally paired pick-up cones 100 to capture and release the beam 50. However, numerous other devices could be used for this function. For example, laterally activated twin shoes, rotary constrictive mechanisms, a single pyramid acting into a rectangular hole at each end of the beam, electromagnets or compressed air operated claws would all be suitable.

In the described embodiment the cyclic dwell mechanism 10 is duplicated at each end of the unit in order to simplify the beam placement arrangements. However a system based on the same principles could be built using only one chain loop and one step-up drive from one wheel, with the end to end functional duplication performed by other means.

Alternative mechanisms using multi-element linkages, slides, etc; could also be used to produce the repetitive cycle of "raise, forward travel, lower, release, dwell, capture" etc., to successively place the slope measuring beam.

The embodiment has been described by way of example only and modifications are possible within the scope of the invention.

Throughout this specification, unless the context requires otherwise, the word "comprise", or variations such as "comprises" or "comprising", will be understood to imply the inclusion of a stated integer or group of integers but not the exclusion of any other integer or group of integers.

I claim:

1. A profilometer comprising:

a beam pivotally connected to a front and a rear foot member, which foot members are spaced along the length of the beam, each said foot member being arranged to be positioned on a section of a surface the profile of which is to be measured, a beam placement mechanism arranged to reposition the beam so that upon forward movement of the profilometer along the surface, the rear foot member will be moved above the surface and then positioned on the section of the surface previously occupied by said front foot member, and an apparatus configured to measure the slope of the beam between the front and rear foot members.

2. A profilometer according to claim 1 wherein the beam is arranged during a dwell phase to remain stationary on the surface while the profilometer continues to travel forward over the surface.

3. A profilometer according to claim 2, further including a device for actuating said apparatus for measuring the slope of the beam during the dwell phase.

4. A profilometer according to claim 2 wherein the repositioning mechanism comprises a cyclic dwell mechanism and an auxiliary mechanism and wherein the beam is arranged to be indirectly connected to the cyclic dwell mechanism by the auxiliary mechanism, the auxiliary mechanism causing isolation of the beam from the cyclic dwell mechanism during the dwell phase.

5. A profilometer according to claim 4 wherein the cyclic dwell mechanism is arranged to output a cyclic motion which is defined by a dwell phase, a combined ascent and forward acceleration phase, a nominally constant speed forward travel phase and a combined decent and deceleration to zero speed phase.

6. A profilometer according to claim 5 wherein the auxiliary mechanism is arranged to be mechanically isolated from the beam during the dwell phase of the cyclic dwell mechanism.

7. A profilometer according to claim 4 wherein the cyclic dwell mechanism is powered from the passive rotation of a pair of wheels which rotate in a synchronised manner as the profilometer is driven forwardly.

8. A profilometer according to claim 7 wherein the pair of wheels have substantially identical circumferences. arranged to be mechanically isolated from the beam during the dwell phase of the cyclic dwell mechanism.

9. A profilometer according to claim 7 further comprising a trigger device associated with one wheel of said pair of wheels for triggering the measuring apparatus to measure the slope of the beam.

10. A profilometer according to claim 7 wherein the pair of wheels are mounted in line.

11. A profilometer according to claim 7 further comprising a trigger device associated with a part of said beam placement mechanism for triggering the measuring apparatus to measure the slope of the beam.

12. A profilometer according to claim 1 further comprising means for determining the total distance from the start of a measuring run to each particular placement of said front foot member.

13. A profilometer according to claim 1 wherein the beam is a torsionally articulated beam.

14. A profilometer according to claim 1 wherein the slope measuring apparatus comprises a servo accelerometer which is mounted so as to indicate the component of gravity which is in line with the longitudinal axis of the beam.

15. A profilometer according to claim 14, further comprising a system to calculate height increments between the front and rear foot members from a signal from the accelerometer a system to accumulate the height increments to give the true height for any placement of the front foot with respect to the start of a recording run, a system to calculate the total distance from the start of the recording run to any placement of the front foot, and a system to form a surface profile.

16. A profilometer according to claim 1 further comprising a wheeled carriage which carries said beam placement system.

17. A profilometer according to claim 16 wherein the carriage is arranged to provide a transversely and longitudinally stable reference for making profile measurements, said carriage including a device for manoeuvring the profilometer with the beam positioning mechanism raised out of contact with the surface over which the profilometer is travelling.

* * * * *